Sept. 4, 1951     C. H. STUIVENBERG     2,567,134
PRINTING MACHINE CONTROLLED BY SYMBOL CARD
Filed Aug. 6, 1947     8 Sheets-Sheet 2

INVENTOR
CORNELIS HENDRICUS STUIVENBERG

BY
Toulmin & Toulmin
ATTORNEYS

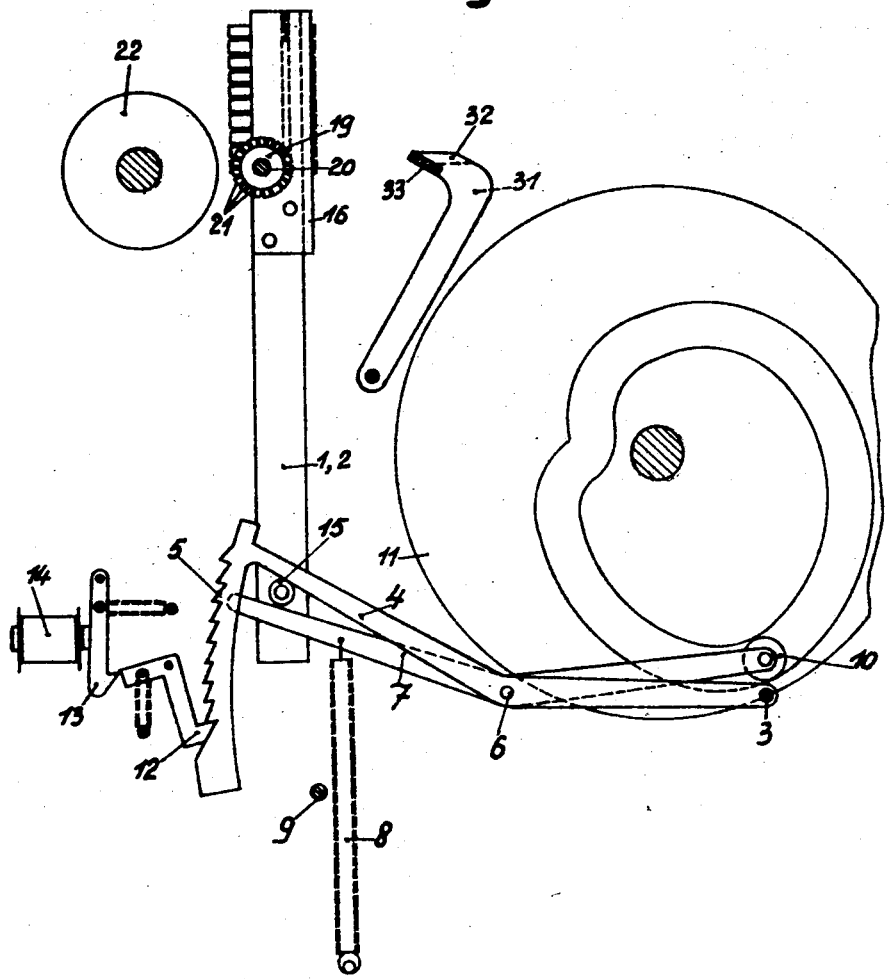

Sept. 4, 1951 C. H. STUIVENBERG 2,567,134
PRINTING MACHINE CONTROLLED BY SYMBOL CARD
Filed Aug. 6, 1947 8 Sheets-Sheet 4

INVENTOR
CORNELIS HENDRICUS STUIVENBERG

BY

Toulmin & Toulmin
ATTORNEYS

Sept. 4, 1951     C. H. STUIVENBERG     2,567,134
PRINTING MACHINE CONTROLLED BY SYMBOL CARD
Filed Aug. 6, 1947     8 Sheets-Sheet 5
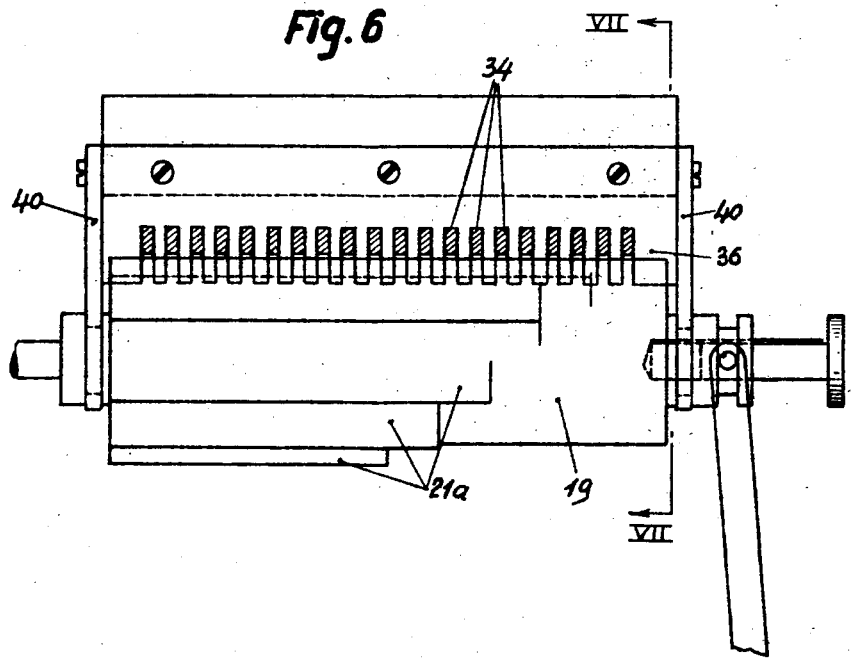
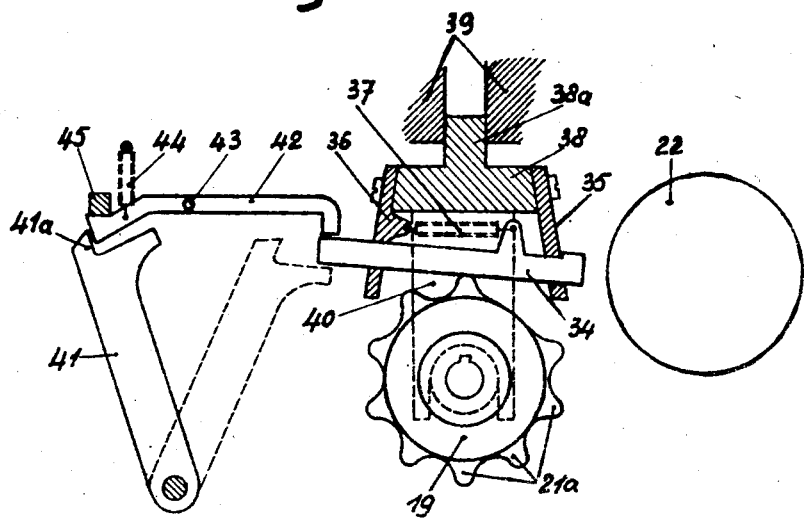
INVENTOR
CORNELIS HENDRICUS STUIVENBERG
BY
Toulmin & Toulmin
ATTORNEYS Sept. 4, 1951 C. H. STUIVENBERG 2,567,134
PRINTING MACHINE CONTROLLED BY SYMBOL CARD
Filed Aug. 6, 1947 8 Sheets-Sheet 6

INVENTOR
CORNELIS HENDRICUS STUIVENBERG
BY
ATTORNEYS

Sept. 4, 1951  C. H. STUIVENBERG  2,567,134
PRINTING MACHINE CONTROLLED BY SYMBOL CARD
Filed Aug. 6, 1947  8 Sheets—Sheet 7

INVENTOR
CORNELIS HENDRICUS STUIVENBERG
BY
Toulmin & Toulmin
ATTORNEYS

Patented Sept. 4, 1951

2,567,134

UNITED STATES PATENT OFFICE 2,567,134

PRINTING MACHINE CONTROLLED BY SYMBOL CARDS

Cornelis Hendricus Stuivenberg, Haarlem, Netherlands

Application August 6, 1947, Serial No. 766,766
In the Netherlands August 27, 1945

Section 1, Public Law 690, August 8, 1946
Patent expires August 27, 1965

9 Claims. (Cl. 235—61.9)

For statistic purposes use is generally made of punched-cards which are controlled by machines adapted to supply in a very short time the numerical data required for statistics. Such numerical data are very accurate indeed, but do not allow of a quick grasp of the situation as represented by the numerical data.

The invention aims at eliminating this disadvantage by making it possible to print a graph in conformity and simultaneously with or instead of the numerical data. Consequently, the invention relates to a printing machine controlled by mark or symbol cards, especially punched cards The invention consists in an arrangement adapted to furnish a printed symbol printed from a basic line at a distance corresponding to the amount of a number punched on the card.

With the machine according to the invention it is possible, in analyzing successive symbol cards, to print a symbol at a corresponding distance from the basic line for each of the data punched on the separate cards, so that a dotted curve formed by the separate printed symbols is formed above the basic line, which curve makes it possible to obtain at once a clear outline of the data utilized. When it has been made possible also to reproduce the totals of added numerical data graphically, preferably by printing the symbols in a different colour, even in the case of long lists the amounts of the separate totals may be taken in at a single glance and the differences appreciated at once.

The drawing illustrates a few embodiments of the invention.

Fig. 3 and 4 are corresponding views of the apparatus with a different adjustment of the parts of the printing mechanism.

Fig. 6 is a front view of part of another embodiment of the invention.

Fig. 7 is a section of the printing apparatus on the line VII—VII of Fig. 6.

Figure 1:
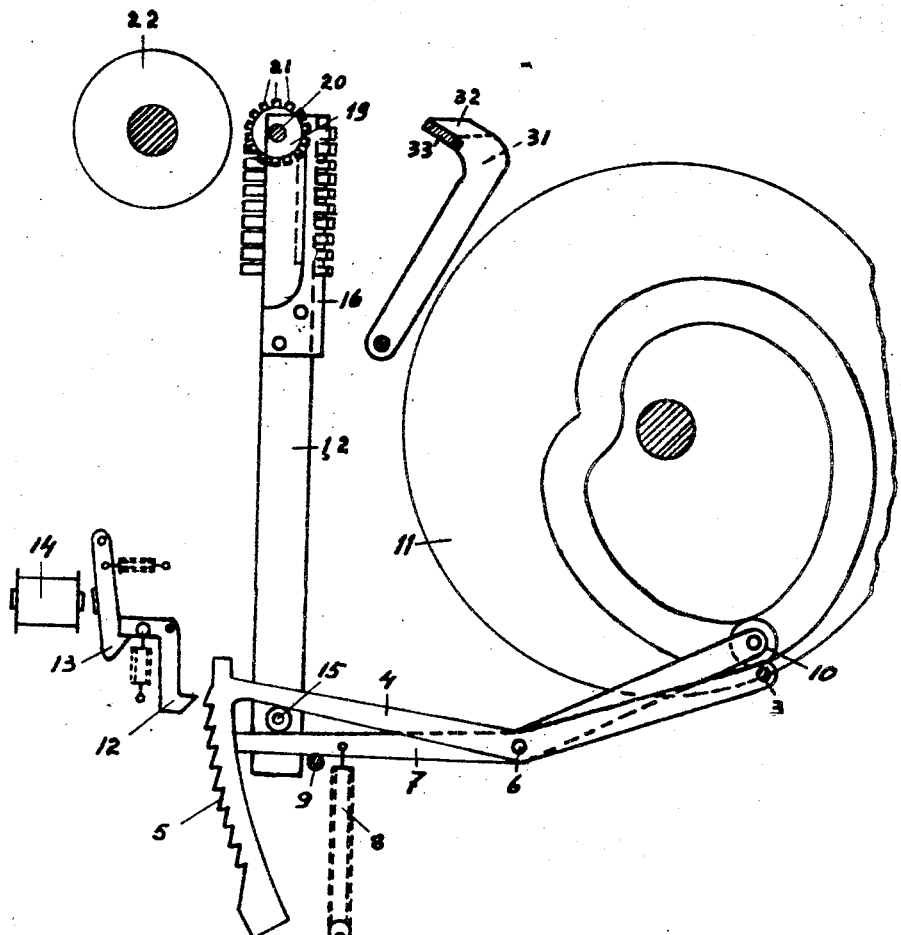
Fig. 1 is a diagrammatic side view of an apparatus for reproducing two-figure numbers graphically.
Figure 2:
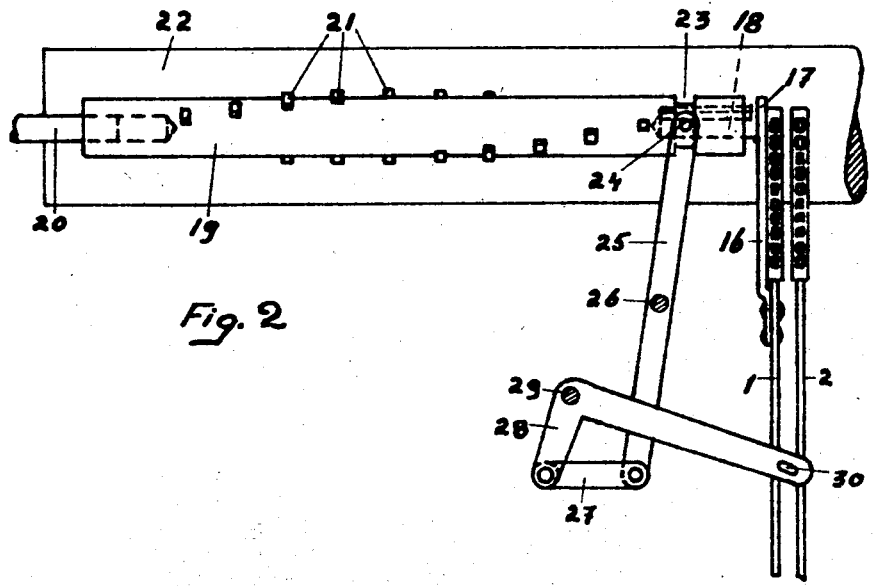
Fig. 2 is a front view of the apparatus.
Figure 4:
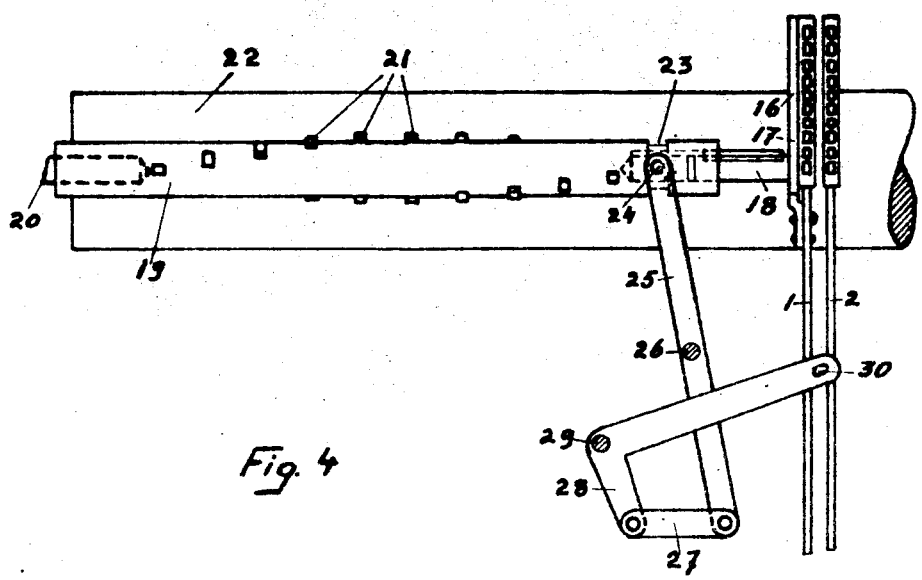

With the embodiment illustrated in Figs. 1-4 two type carriers 1 and 2 have been provided, which may be adjusted from one printing position immediately into the next by means of driving means working like a pair of tongues known per se. On a stationary axle 3 rests a lever arm 4 having a rack 5. By means of a pin 6 an arm 7 is supported on the arm 4, such arm 7 being acted upon by a spring 8, tending to pull said arm 7 against a fixed abutment 9. The free end of the arm 7 bears a roller 10, which engages a guiding or cam slot in a disc 11. 12 denotes a locking pawl, which can be released by the armature 13 of an electromagnet 14. Both arms 4 and 7 cooperate with abutment cams 15 of the type carriers 1 and 2. At the side of the type carrier 1 a rack 16 has been fastened meshing with a pinion 17 (Fig. 2). The pinion 17 is keyed to a shaft 18 which supports one end of a roller 19. This roller is movable in longitudinal direction on the shaft 18 but is not rotatable thereon. The other end of roller 19 is slidably and rotatably supported by a sationary pin 20. The roller 19 carries ten adjusting devices 21 placed so as to be movable in the same way as types; the adjusting devices 21 have been provided on the roller 19 along the path of a helix at equal distances from each other in such a manner, that each time the roller is rotated by 18°, a different adjusting device comes into the writing position with respect to the printing roller 22.

The end of the roller 19 is provided with an annular recess 23 into which extends a stud 24 of a two-arm lever 25. The lever 25 is pivoted about a fixed pin 26 and is connected through a link 27 to a bell crank lever 28, which is pivoted about a pin 29 and is coupled to the type carrier 2 by means of a pin-slot connection 30. The numeral 31 denotes printing hammers for striking the types of the type carriers 1 and 2. On the side of the printing hammer 31 two other levers 32, exactly identical in shape with the printing hammers, have been provided, between which a rail 33 is fitted, which serves to strike the adjusting devices 21 of the roller 19.

The apparatus described above operates as follows:

When a punched card is used, the two type carriers 1 and 2 are adjusted in accordance with the figures of the detected two-figure number by means of the lever mechanisms 3—15. When then the type carrier 1 belonging to the higher figure place is raised, a rotary movement of the shaft 18, and thus of the roller 19, is effected by means of the rack 16 and the pinion 17. This movement is in accordance with the upward movement of the type carrier 1 and consequently corresponds to the figure value adjusted. Simultaneously with the rotative movement of shaft 18, the roller 19 is moved to the left by means of the lever system 24—30 owing to the upward movement of the type carrier 2. The extent of this leftward movement of roller 19 corresponds to the figure value to which the type carrier 2 is adjusted.

The lever transmission for the movement of the roller 19 and the distance between the separate adjusting devices 21 of the roller 19 have been so chosen that the movement of the roller 19, when the type carrier 2 is being moved by one step, amounts to one tenth of the distance between two successive adjusting devices 21.

From the above it thus appears that owing to the rotary movement of the roller 19, the adjusting device 21, which corresponds to the figure value on which the type carrier 1 has been adjusted, reaches the writing position, while at the same time the roller 19, and thus the adjusting device 21 placed in the writing position, is moved to the left as many tenths of the distance between two successive adjusting devices 21 as corresponds to the figure value on which the type carrier 2 was adjusted. If, for example, of the punched card to be utilized the number "75" has been detected, the type carrier 1 has been adjusted in accordance with the figure value "7" of the ten and the type carrier 2 in accordance with the figure value "5" of the unit. At the same time the roller 19 has been rotated to such an extent that instead of the adjusting element "0" which in the position of rest of the roller occupies the typing position, the eighth adjusting device 21 representing "7" is moved from the right into the printing position. At the same time the roller 19 on account of the adjustment of the type carrier 2 has been displaced to the left through half the distance between two successive adjusting devices 21. Consequently, at the end of the adjusting process the adjusting device 21 corresponding to the figure value "7" of the ten is in a position corresponding to a figure value "7, 5" and to the numerical value "75" with respect to the unit. After the adjustment, the printing hammers 31 strike against the adjusted types of the type carriers 1 and 2, and the rail 33 strikes against the adjusting device 21 in the writing position, so that the detected numerical value and its graphical reproduction are printed simultaneously. In order to reproduce numerical values graphically it is as a rule sufficient to consider only two figure places of the numbers, viz. the two highest figure places. When in such cases it is desirable to print the numbers with their joint figure places, other type carriers for printing the other figures may be provided to the right of the type carriers 1 and 2 without any objection.

Figure 5:
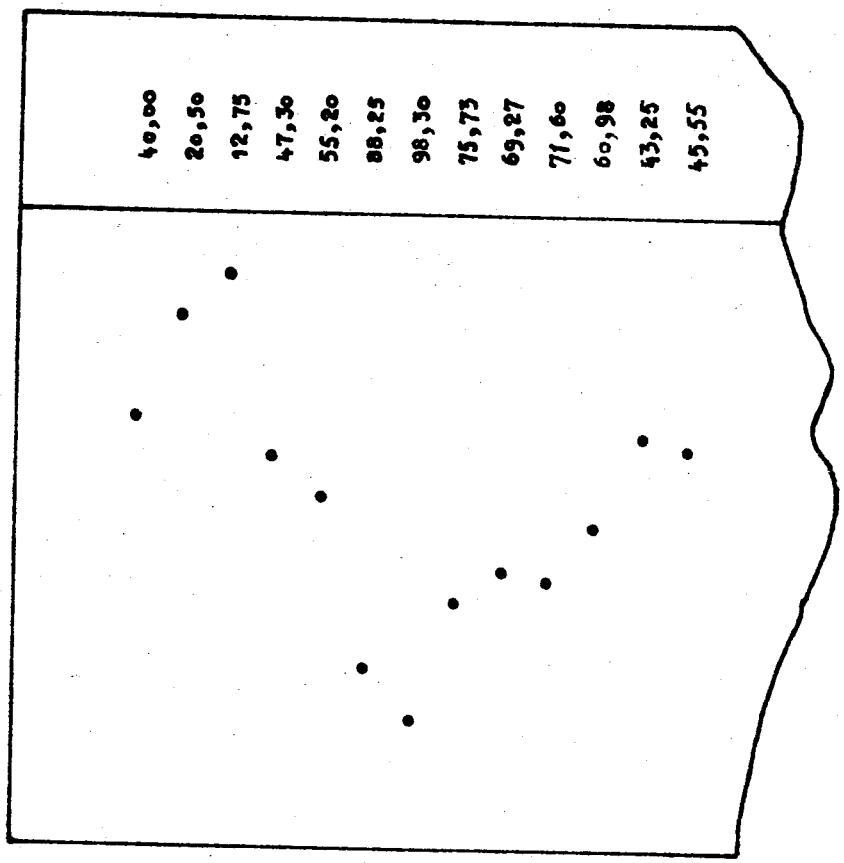
Fig. 5 shows a list printed on the machine according to the invention.

Fig. 5 shows a list which has been printed on the machine according to the invention. In the drawing the printed page has been turned so far that the curve shown by the printed symbols is clearly visible. In the separate printed lines the four-figure numbers detected by the punched cards have been printed at the right-hand side and the printed symbols of the graph at the left-hand side.

In order to improve the comprehensibility of the graph, it is advisable to print a symbol not only at a distance from the basic line corresponding to the amount of a number, but to fill up the whole space between the printed symbols and the basic line with other symbols, so that in a sense a printed bar of corresponding length is obtained.

Figure 8:
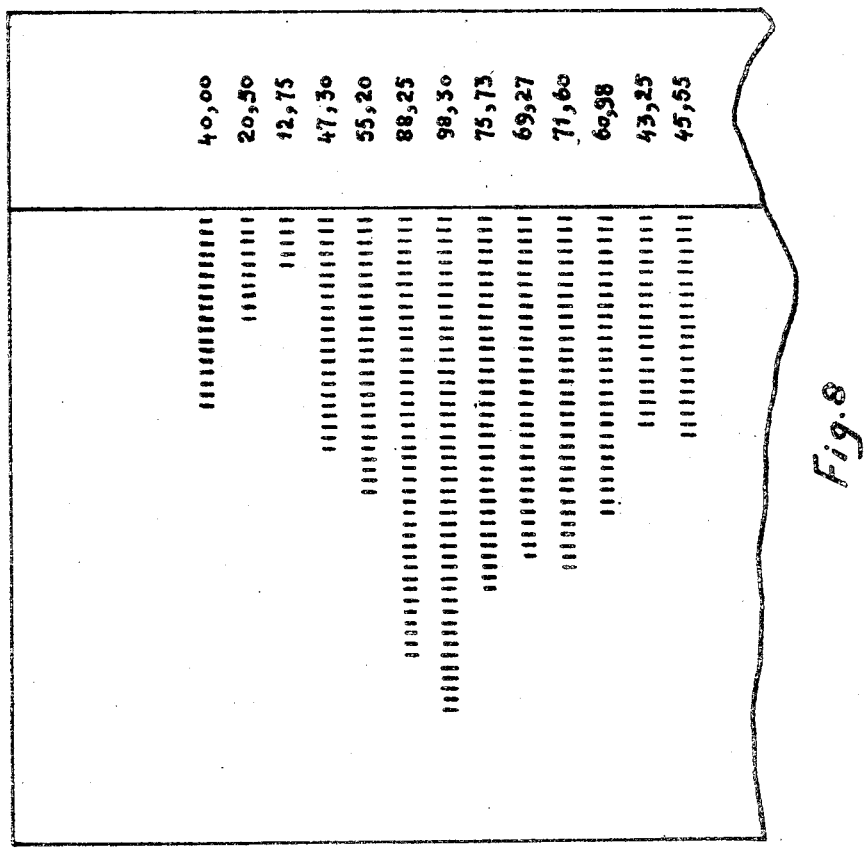
Fig. 8 shows a list printed on the machine according to Figs. 6 and 7.

An embodiment of the invention with which such a print is possible is illustrated in Figs. 6-8. In this case the roller 19 has riblike elevations 21a of different length acting as types instead of the adjusting devices 21. Consequently the roller has a shape corresponding to that of the known stagger rollers of calculating machines, with this difference that the longest rib 21a belongs to the numerical value "0," so that the separate numerical value is represented by the cut-away portions of the ribs 21a.

The ribs 21a of the roller 19 co-operate with types 34, which are supported in supports 35 so as to be rotatable and movable and are guided by a cam 36. Springs 37 act on the types 34 in such a manner that these are simultaneously drawn away from the platen 22 and kept in contact with the ribs 21a of the roller 19. The guiding parts 35 and 36 for the types 34 are fixed to a line 38 equipped with a rib 38a extending upwards. The rib 38a slides in stationary guides 39. To both ends of the line 38 supports 40 have been fitted, with which the line 38 is mounted on the roller 19 in such a manner that the roller can be freely rotated, but the line 38, and consequently also the types 34, is (are) taken along in the direction of movement by means of the members 40 when the roller 19 moves in the direction of the centerline. The types 34 may be swung against the platen 22 by stationarily supported printing hammers 41. In that case the types 34, when they have been lifted from the roller 19 and swung up by a rib 21a, are in their inoperative position with respect to the printing hammers 41, whereas they are in their operative position with respect to the printing hammers 41 when they have dropped into a cavity between two ribs owing to the action of the springs 37. Each printing hammer 41 has at the top a projection 41a, in front of which may lie a double-armed lever 42, which is supported on a stationary rod 43. The double-arm lever 42 is acted upon by a spring 44, which tries to pull the lever against a rail 45. The rail 45 is raised shortly before the printing hammers 41 are released, so that then the double-arm levers 42 can perform a clockwise rotary movement, as a result of which their right ends come to lie on the end of the types 34.

The printing apparatus described is operated in the following manner.

When the type carriers 1 and 2 are adjusted, the roller 19 is rotated and moved in the manner already described, in accordance with the two figure values of the highest figure places. Owing to the rotation of the roller 19 the said rib 21a co-operates with the type 34, which corresponds to the figure value of the highest figure place. As the rib 21a has been cut away as far as corresponds to the figure value, a corresponding number of types 34 is released for a rotary movement in the operative position under the influence of the springs 37. Thus the left end of the said types 34 is in the track of movement of the printing hammers 41. Shortly before the printing hammers 41 are released, the rail 45 is lifted, so that the straight end of the double-armed levers 42 comes to lie on the left end of the types 34 owing to the action of the springs 44. The types 34 corresponding to the numerical value adjusted are in the operative position, so that the levers 42 striking the said types can turn clockwise such a distance that their left end releases the projection 41a of the corresponding printing hammers 41. While thus the said printing hammers 41, the opposite types 34 of which are not in the operative position, remain locked by the corresponding levers 42 by means of the projections 41a, the other printing hammers 41 are released by the levers 42, so that they may become operative when all the printing hammers 41 are released by the printing driving gear. In the apparatus described therefore, only those printing hammers 41 required for striking the desired types 34 shoot forward into the operative position. The other printing hammers 41, after having covered a very slight distance, strike with their projections 41a those levers 42, which are in the locking position. If, for example, the roller 19 has been adjusted in accordance with a numerical value "75," all the types 34 are printing as far as the distance from the basic line which corresponds to the numerical value "75." The graph of the numerical value thus obtained is, therefore, a correspondingly long printed symbol, which may, for example, have the shape of a hatched bar.

Fig. 8 shows a list printed on the machine according to the invention in the shape of the embodiment last described. In this figure, too, the printed page has been turned down in the same way as the printed list in Fig. 5, so that the curve represented by the hatched bars is clearly visible.

For statistic purposes it is often of importance to compare the numerical data actually obtained, the so-called real values, with the numerical data aimed at, i. e. the so-called desired values. For such purposes, too, the machine according to the invention may be used, the real values and the desired values being printed in immediate succession, preferably in different colours. In the embodiment according to Figs. 1–5 the graphs of both values may be printed in the same line. In the embodiment according to Figs. 6–8 the graph may also be printed in the same line in a similar manner, but it is advisable to move the roller 19, which governs the types, a short distance between the printing of the two values, in such a way that the hatches of the second graph are printed in between the hatches of the first graph. Of course it is also possible in this case to print the two graphs in a separate line or partly overlapping; the roller 19 need not then be moved.

Figure 9:
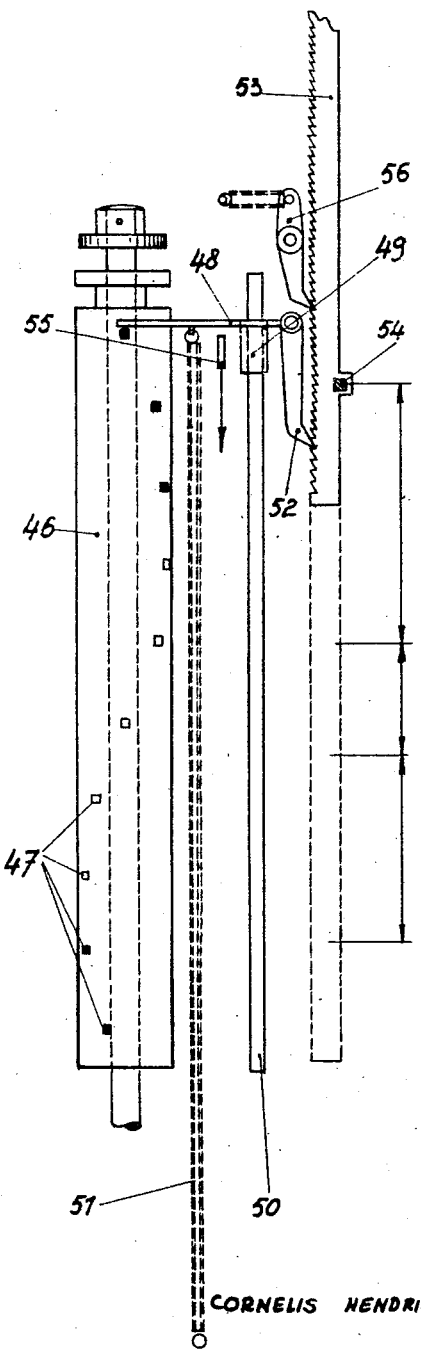
Fig. 9 illustrates a third embodiment of the invention, which makes it possible to reproduce separate data and totals in graphs.
Figure 10:
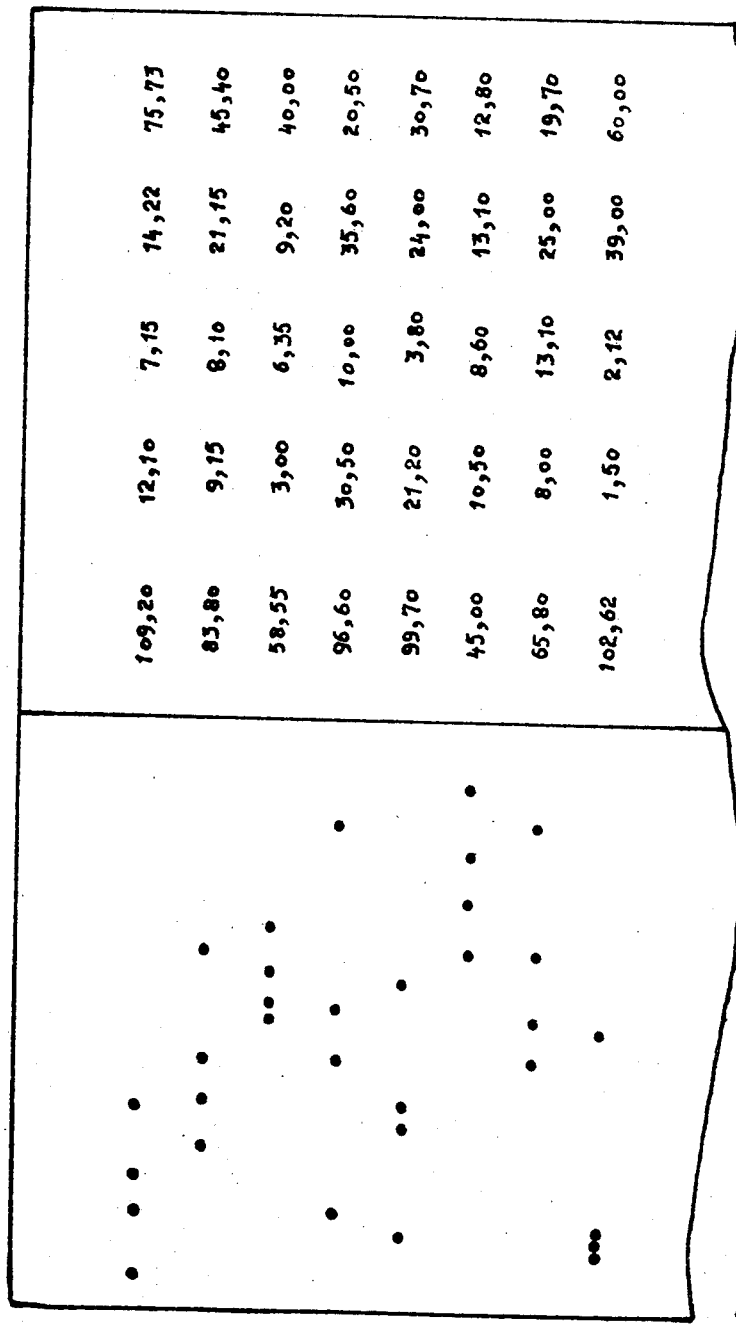
Fig. 10 shows a list printed on the machine according to Fig. 9.

In many cases it is desirable to reproduce more than two amounts and simultaneously the total of these amounts graphically. In such cases use is often made of a graph in which the separate numerical data are reproduced over each other, so that the height of the total image at the same time represents the total of the separate amounts. An embodiment of the invention with which such a graph can be made is illustrated in Fig. 9. In this embodiment, too, a roller 46 has been provided which is rotated and moved dependent on the adjustment of two type carriers, in the same way as the roller 19 in the preceding embodiments. Whereas, however, in the previous embodiment the roller 19 itself bears the types to be printed or controls them directly, in the present case the roller 46 is used as abutment member for the indirect adjustment of a type. The roller 46 has abutment pins 47, helically arranged at equal distances from each other. With the abutment pins 47 co-operates a feeler 48 of a slide 49, which has been mounted on a rail 50 so as to slide longitudinally and is acted upon by a tension spring 51. The slide 49 bears a pawl 52, which meshes with the teeth of a rack 53. This rack is capable of sliding in parallel to the rail 50 in stationary guides not represented in the drawing and bears a type 54 for printing dots for the graph. 55 denotes an actuating member, which releases the slide 49 in each cycle of the machine, preferably not until the type carriers have been adjusted to the numerical value, so that the feelers 48 come into action and the slide 49 can be adjusted correspondingly under the action of the spring 51, and at the end of the cycle of the machine returns the slide 49 to its position of rest, as illustrated in Fig. 9. Further a stationary pawl 56 has been provided, which prevents the rack 53 from being adjusted when the slide 49 is moved back.

The devices for printing the types 54 have not been illustrated in this embodiment. Numerous printing hammers may be provided, of which, dependent on the adjustment of the rack 53 and the type 54 respectively, only the one to which the type 54 is exactly opposed is released; use may also be made of a printing rail parallel to the path of movement of the type 54, which grasps the type 54 in any printing position.

The printing apparatus described operates as follows:

When the two type carriers corresponding to the highest value places of the amount to be reproduced are adjusted, the roller 46 is rotated and moved accordingly. Subsequently the slide 49 is released by the actuating member 55; the said slide, under the action of the spring 51, moves until its feeler 48 strikes against the abutment 47, which has been placed in the operative position during the adjustment of the roller 46. During the adjustment of the machine to the numerical value "75" the said abutment is, for example, at the distance corresponding to this numerical value. During its movement, the slide 49 takes along the rack 53 by means of the pawl 52, thus placing the type 54 in the printing position corresponding to the numerical value "75." When the rack 53 is moved, the pawl 56 glides across the teeth of the rack 53 and finally drops into the tooth cavity corresponding to the adjustment of the type 54. Now the adjusted type 54 is printed, and thus the dot or line or the like representing the numerical value is printed. Immediately afterwards the actuating member 55 moves back, taking along the slide 49 to its initial position, in the course of which the pawl 52 glides across the teeth of the rack 53. As the rack 53 is kept in its position by the pawl 56, the type 54 remains in the adjusted position at the end of the cycle of the machine.

If, then, a second numerical value is adjusted on the machine, the roller 46 is placed from its previously adjusted position into the new position by rotation and sliding. Subsequently the slide 49 is again released by the actuating member 55, so that the feeler 48 can detect the new adjustment of the roller 46. During the movement of the slide 49 involved in this the rack 53 is taken along again by means of the pawl 52 in such a manner that the type 54 is placed from the previously adjusted position in a new position. In the new position the type 54 and the rack 53 are secured again by the pawl 56, upon which the type 54 is printed again in the manner described above, while the slide 49 is placed back in its position of rest by means of the device 55. At the end of the cycle of the machine the type 54 is thus in the new position, which corresponds to the sum of the two amounts previously adjusted, while the roller 46 is adjusted in accordance with the numerical value last adjusted.

If a third numerical value is to be reproduced, the roller 46 is rotated and moved from the position in which it has been so far into the position corresponding to the third numerical value during the next cycle of the machine. Immediately afterwards this new adjustment of the roller 46 is detected by the feeler 48 of the slide 49, the rack 53 being moved in the normal way and the type 54 thus being placed in a third setting position. This is followed by the printing, upon which the slide 49 is moved back in the manner described above.

The printing apparatus last described is, therefore, so operated that each time the symbol last printed constitutes the starting point for the next print of a symbol, until the desired total of the data has been reproduced. The machine chiefly operates in such a manner that an intermediate member which detects the adjustment of the roller and transfers the distance from the basic line to a type carrier, moves the carrier in only one direction by means of a catch.

In the case of a machine of the type just described it is desirable to print, besides the graphs printed in succession in the line, also the respective amounts. As these amounts are to be printed in the same line, the printing gear of the machine is preferably adapted to the numerical data in such a manner that a number of sets of type carriers which are adjusted jointly in accordance with the numerical data, may be printed separately at will, so that the numerical data may be printed successively in different columns. If in another column the total of the numerical data is also printed, it is advisable to take care that during the printing of the total the part of the printing gear which serves to print the graphs is not moved together with the rest. Thus, separate type carriers may, for example, be provided for printing the total, which carriers are not connected to the adjusting gear for the other type carriers.

What I claim is:

1. In a device for printing numerical values and corresponding graphical records, a first movable carrier carrying figure types of a first predetermined digit, a second movable carrier carrying figure types of a second predetermined digit, a plurality of elements for use in connection with the production of said graphical records, a control member supporting said elements, said elements being arranged along a path extending over a predetermined length and the circumference of said control member, means for rotatably and reciprocably supporting said control member, and means operatively connecting said carriers and said control member to bring about rotation and longitudinal movement of said control member in response to the actuation of said first and second carrier respectively.

2. In a device for printing numerical values and corresponding graphical records, a first movable carrier carrying figure types of a first predetermined digit, a second movable carrier carrying figure types of a second predetermined digit, a printing member, a plurality of types supported by said printing member for making said graphical records, said last-mentioned types being arranged in spaced relationship along a path extending over a predetermined length and the circumference of said printing member, means for rotatably and reciprocably supporting said printing member, and means operatively interconnecting said carriers and said printing member to bring about rotative and longitudinal movement of said printing member in response to the actuation of said first and second carrier respectively.

3. In a device for printing numerical values and corresponding graphical records, a first movable carrier carrying figure types of the first digit, a second movable carrier carrying figure types of the second digit, a printing roller, supporting means for rotatably supporting said printing roller and allowing reciprocable movement of said printing roller in longitudinal direction thereof, a plurality of marking types for effecting graphical markings, said marking types being arranged on said printing roller in spaced relationship along a helical path, and means operatively interconnecting said carriers and said roller so as to cause said roller to rotate in response to the movement of said first carrier and to move in longitudinal direction in response to movement of said second carrier.

4. In a device for printing numerical values and corresponding graphical records, a first movable carrier carrying figure types of a first digit, a second movable carrier carrying figure types of a second digit, roller means provided with a plurality of ribs extending in the longitudinal direction of said roller means and being of staggered length, supporting means for rotatably and reciprocably supporting said roller means, sliding means connected to said roller means so as to reciprocate in unison with said roller means, a plurality of printing elements arranged in series for producing graphical markings, said printing elements being supported by said sliding means and being arranged in co-operation with said roller means to move into operative and inoperative position depending on the position of said ribs relative to said printing elements, and means operatively interconnecting said carriers and said roller means to bring about rotative and longitudinal movement of said roller means in response to the movement of said first and second carrier respectively.

5. In a device for printing numerical values and corresponding graphical records, a first movable carrier carrying figure types of a first digit, a second movable carrier carrying figure types of a second digit, roller means provided with a plurality of spaced ribs extending in the longitudinal direction of said roller means and being of staggered length, supporting means for rotatably and reciprocably supporting said roller means, sliding means connected to said roller means so as to reciprocate in unison therewith, a plurality of printing elements arranged in series producing graphical markings, said printing elements being supported by said sliding means and being arranged in co-operation with said ribs and the space therebetween to move into operative and inoperative position respectively, and means operatively interconnecting said carriers and said roller means to bring about rotative and longitudinal movement of said roller means in response to the movement of said first and second carrier respectively.

6. In a device for printing numerical values and corresponding graphical records, a first movable carrier carrying figure types of a first digit, a second movable carrier carrying figure types of a second digit, roller means provided with a plurality of circumferentially spaced ribs extending in the longitudinal direction of said roller means and being of staggered length, the length of said ribs corresponding to a distance graphically corresponding to the numerical values to be printed, supporting means for rotatably and reciprocably supporting said roller means, sliding means connected to said roller means so as to reciprocate in unison therewith, a plurality of printing elements arranged side by side in spaced relationship for printing graphical markings, the total distance covered by the side by side arrangement of said printing elements corresponding to the length of the longest length to be printed in conformity with the highest numerical value to be printed, said printing elements being supported by said sliding means and being arranged in co-operation with said roller means to move into operative or inoperative position depending upon the position of said ribs relative to said printing elements, and means operatively interconnecting said carriers and said roller means so as to cause said roller means to rotate in response to the movement of said first carrier and to move in longitudinal direction in response to the movement of said second carrier.

7. In a device for printing numerical values and corresponding graphical records, a first movable carrier carrying figure types of a first predetermined digit, a second movable carrier carrying figure types of a second predetermined digit, a control member, supporting means for rotatably supporting said control member and allowing sliding movement thereof in the longitudinal direction of said control member, a plurality of abutment members spaced from each other and extending along a helical path on said control member, sliding means reciprocable in a direction parallel to the direction of longitudinal movement of said control member, first means associated with said sliding means for engagement with any of said abutment members depending upon the rotative position of said control member, printing means movable in conformity with the longitudinal movement of said control member, second means operatively interconnecting said first means and said printing means, and means operatively interconnecting said carriers and said control member so as to cause said control member to rotate in response to the movement of said first carrier and to move said control member in longitudinal direction in response to the movement of said second carrier.

8. In a device for printing numerical values and corresponding graphical records, a first movable carrier carrying figure types of a first predetermined digit, a second movable carrier carrying figure types of a second predetermined digit, a control member, supporting means for rotatably supporting said control member and allowing sliding movement thereof in the longitudinal direction of said control member, a plurality of abutment members spaced from each other and extending along a helical path on said control member, sliding means reciprocable in a direction parallel to the direction of longitudinal movement of said control member, first means associated with said sliding means for engagement with any of said abutment members depending upon the rotative position of said control member, printing means movable in conformity with the longitudinal movement of said control member, second means operatively interconnecting said first means and said printing means, means operable in response to the movement of said first carrier to effect the rotation of said control member, means operative in response to the movement of said second carrier in one or the other direction to cause said control member to move in a first longitudinal direction and in the opposite longitudinal direction respectively, and means operable automatically to prevent return of said sliding means into its starting position during movement of said control member in said opposite direction.

9. In a device for printing numerical values and corresponding graphical records, a first movable carrier carrying figure types of a first predetermined digit, a second movable carrier carrying figure types of a second predetermined digit, a control member, supporting means rotatably supporting said control member and allowing sliding movement of said control member in its longitudinal direction, a plurality of abutment members spaced from each other and extending along a helical path on said control member, sliding means reciprocable in a direction parallel to the direction of the longitudinal movement of said control member, means associated with said sliding means for engagement with any of said abutment members depending upon the rotative position of said control member, rack means movable in longitudinal direction thereof, first pawl means associated with said sliding means for co-operation with said rack means, printing means associated with said rack means so as to be movable in unison therewith, second pawl means independent of said sliding means, yielding means for continuously urging said second pawl means into engagement with said rack means, means operable in response to the movement of said first carrier to effect the rotation of said control member, and means operative in response to the movement of said second carrier in one or the other direction to cause said control member to move in a first longitudinal direction and in the opposite longitudinal direction respectively, said second pawl means being arranged to hold said rack means stationary during movement of said control means in said opposite direction.

CORNELIS HENDRICUS STUIVENBERG.

REFERENCES CITED

The following references are of record in the file of this patent:

UNITED STATES PATENTS

| Number | Name | Date |
|---|---|---|
| 2,310,437 | Johnson | Feb. 9, 1943 |